Figure 1:
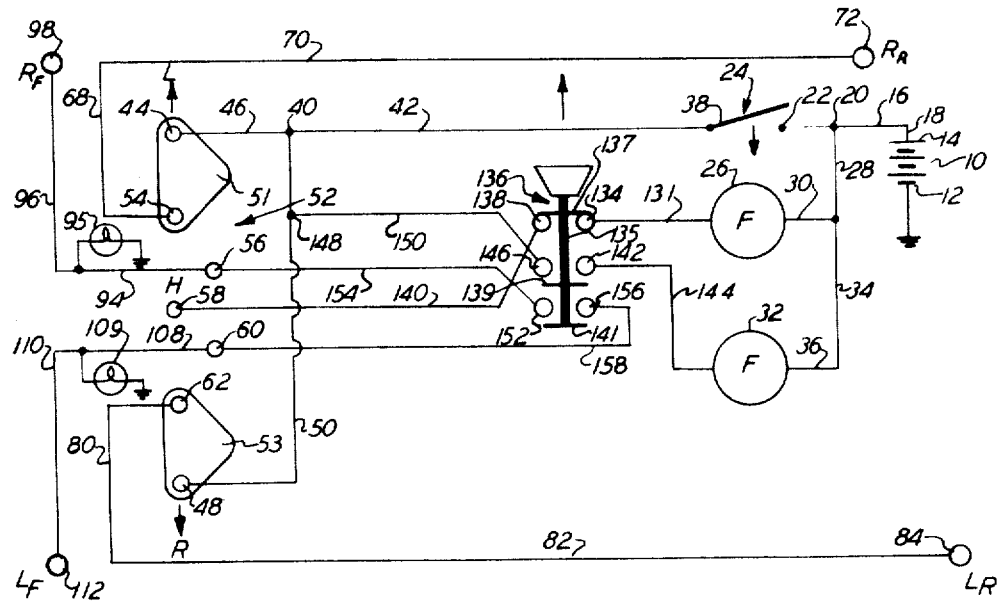

United States Patent

[11] 3,593,274

| [72] | Inventor | Allen Dwane Krugler, Jr.<br>Livonia, Mich. |
|---|---|---|
| [21] | Appl. No. | 736,742 |
| [22] | Filed | June 13, 1968 |
| [45] | Patented | July 13, 1971 |
| [73] | Assignee | Ford Motor Company<br>Dearborn, Mich. |

[54] LAMP FAILURE WARNING SYSTEM
6 Claims, 2 Drawing Figs.

[52] U.S. Cl. .................................................. 340/67,
340/80, 340/251
[51] Int. Cl. ..................................................... B60q 1/38,
H05b 37/03
[50] Field of Search .................................. 340/67, 73,
79—80, 81, 82, 85, 251, 252, 331

[56] References Cited
UNITED STATES PATENTS
| 2,486,599 | 11/1949 | Hollins | 340/252 |
| 3,408,625 | 10/1968 | Skinner | 340/79 |
| 3,422,421 | 1/1969 | Moller et al. | 340/331 |

Primary Examiner—John W. Caldwell
Assistant Examiner—Kenneth N. Leimer
Attorneys—John R. Faulkner and Keith L. Zerschling ABSTRACT: A lamp-out warning system for lamps that are intermittently operated, particularly turn signal and brake lamps on an automotive vehicle, in which a warning means is provided for checking the lamps during the time that the lamps are not energized from their normal source of electric power. In an automotive vehicle the turn signal lamps or brake lamps are energized intermittently through either a flasher switch or a brake lamp switch, respectively. A warning is given when any one of the lamps is burned out or otherwise inoperative but only when the lamps are burned out or otherwise inoperative but only when the lamps are not in their intermittently energized condition. This may be accomplished by the use of a disabling means which disables the warning means during the time of this intermittent operation.

PATENTED JUL 13 1971 3,593,274

ALLEN D. KRUGLER, JR.
INVENTOR

BY John L. Faulkner
Keith L. Zerschling
ATTORNEYS

3,593,274

LAMP FAILURE WARNING SYSTEM

BACKGROUND OF THE INVENTION

There are many prior art devices for checking lamps that are intermittently energized particularly in automotive vehicles and for giving a warning when these lamps are open circuited. The warning systems of the prior art are primarily employed when these lamps are energized intermittently through their normal energizing circuits, thus, the warning is given when the lamps are normally energized. In an automotive vehicle this, of course, implies that the warning will be given if a lamp is open circuited when the vehicle is operating in a turn or the vehicle operator has applied the brakes. This is a very inconvenient time for the vehicle operator to observe or take cognizance of a warning that one or more of the lamps is in an open circuited condition since the vehicle operator is fully occupied with other duties, such as executing a turn, turning the turn signal lamp switch or decelerating the vehicle. During these times the attention of the vehicle operator is fully required to perform these duties.

In the present invention a warning system is provided that will give a warning of a turn signal lamp or brake lamp failure or open circuit condition at all times in which the turn signal switch or brake lamp switch is in the open position. During these times the vehicle operator may readily observe the warning that is given to him by the system that a turn signal lamp or brake lamp is in an open circuited condition. Moreover, means are provided for disabling the warning means when the switches, either the turn signal lamp switch or the brake lamp switch, are energized. This is accomplished by an isolation or disabling means that isolates the warning means from the electrical energy applied to the turn signal or brake lamp circuits.

SUMMARY OF THE INVENTION

In the invention there is provided a normal circuit for energizing intermittently certain lamps, particularly, the turn signal lamps or brake lamps of an automotive vehicle. A warning means, preferably in the form of a warning lamp, is provided which is connected to the electrical storage battery of the vehicle preferably through the "Accessory" and "On" terminals of the ignition switch. Means are provided also for sending a sensing current through the turn signal lamps and brake lamps which, in the case of an automotive vehicle, may utilize the same bulb for the rear turn signal lamps and brake lamps. This sensing current has a value that is insufficient to cause incandescence of the filaments of these lamps. In the event, however, of a lamp failure, the current cannot flow through the open circuited lamp filament and it flows, therefore, through a circuit means which includes a switch, preferably in the form of a transistor coupled in circuit with the warning means or lamp. This switch, or transistor, will be switched to the on position by means of this current flow. As a result, current to energize the warning means or lamp will flow from the source of electrical energy, or storage battery of the vehicle, through the "On" or "Accessory" terminals of the ignition switch, through the warning means or lamp, through the switch, preferably in the form of a transistor, to ground. As a result, this warning lamp will give the vehicle operator a warning that one or more of the lamps to be tested has been open circuited.

In addition, means are provided that are connected to the switch or transistor for keeping it in its off condition when any one or more of the lamps to be tested is energized through its normal energizing circuits, that is, either through the turn signal switches or through the stop lamp switch that is connected to the brake pedal of the vehicle. This may be accomplished by means of transistors that are switched to their conducting state by the electrical energy from the turn signal or brake lamp switches. These transistors are so connected to the first switch or transistor that they prevent this first switch or transistor from being switched to its conducting state during this time.

It can be readily appreciated that the above described system provides an uncomplicated and convenient means for checking turn signal or brake lamp failures when the lamps or the circuits to them are open circuited. The warning will be given at a time in which the vehicle operator is engaged in normal driving and is not in the process of executing a turn or decelerating the vehicle by means of applying the brakes. As a result, the motor vehicle operator may observe the warning given to him when a turn signal lamp or brake lamp is in the open circuited condition without having his attention diverted by other driving tasks.

An object of the present invention is the provision of a lamp failure indicator which gives warning to a vehicle operator which may be conveniently observed during the time that the vehicle operator is not engaged in vehicle maneuvers which require his full attention.

Another object of the invention is the provision of a lamp failure indicator in which a warning means is energized during normal driving conditions when the lamps are not in use so that the vehicle operator may have a long period of time to observe the warning given to him and also may observe such a warning when his attention is not being diverted by vehicle maneuvers that require his full attention.

A further object of the invention is the provision of a relatively inexpensive, uncomplicated lamp failure indicator conveniently employed with lamps that are intermittently energized on automotive vehicles in which a warning means gives a warning during the time that the vehicle lamps are in their unenergized condition and in which disabling or isolation means are employed to prevent the warning means from giving such a warning when the turn signal or brake lamps are energized for their normal energizing sources.

Figure 2:
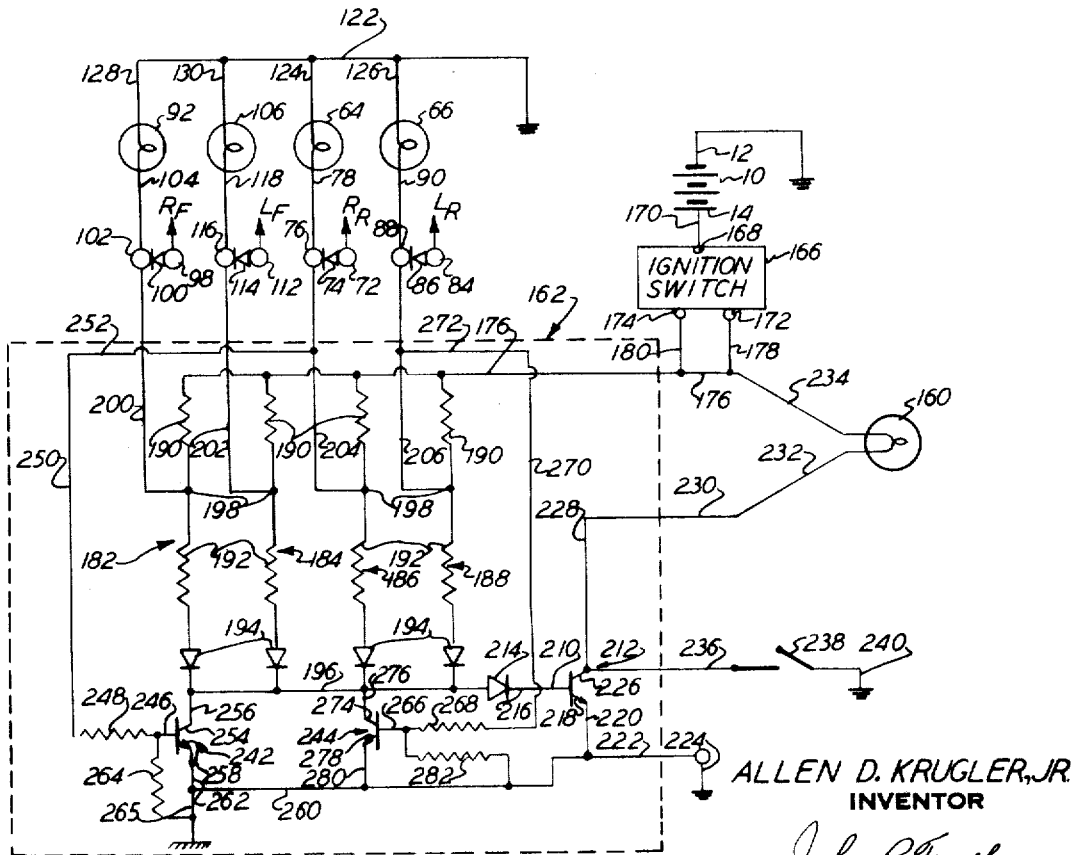

Other objects and attendant advantages of the present invention may be more readily realized as the specification is considered in connection with the attached drawings in which:

FIG. 1 discloses a conventional turn lamp and brake lamp circuit for an automotive vehicle; and FIG. 2 is a circuit diagram of the circuit means employed with the circuit of FIG. 1 for providing a warning to the vehicle operator when any one or more of the turn signal lamps or brake lamps is in an open circuited condition.

Referring now to the drawings in which like reference numerals designate like parts throughout the several views thereof, there is shown in FIG. 1 a source of electrical energy in the form of an electrical storage battery 10 having a negative terminal 12 connected to ground and a positive terminal 14 connected to lead 16 through a lead 18. The lead 16 in turn is coupled to a junction 20 and the junction 20 is connected to a stationary contact 22 of a normally open brake operated lamp switch 24 that is closed when the brakes of the automotive vehicle are applied. The junction 20 is also connected to one terminal of a flasher switch 26 through leads 28 and 30 and also to a terminal of a second flasher switch 32 through leads 28, 34 and 36.

The movable blade 38 of the normally open brake operated lamp switch 24 is connected to a junction 40 through a lead 42 and the junction 40 is in turn connected to a stationary contact 44 through a lead 46 and to another stationary contact 48 through a lead 50. These stationary contacts 44 and 48 form part of a turn signal switch, generally designated by the numeral 52.

The turn signal switch 52 also comprises stationary contacts 54, 56, 58, 60 and 62 and movable contacts 51 and 53. The stationary contacts 54 and 62, respectively, are connected to the right rear and left rear turn signal and brake lamps 64 and 66, respectively, shown in FIG. 2. The stationary contact 54 is connected to the right rear turn signal and brake lamp 64 through leads 68, 70, junction 72, isolation diode 74, junction 76 and lead 78, and the stationary contact 62 is connected to the left rear turn signal and brake lamp 66 through leads 80, 82, junction 84, isolation diode 86, junction 88 and lead 90.

The stationary contact 56 is connected to the right front turn signal lamp 92 through leads 94, 96, junction 98, isolation diode 100, junction 102 and lead 104 and is connected to a turn indicator lamp 95 by the lead 94. Similarly, the stationary contact 60 is connected to the left front turn signal lamp 106 through lead 108, lead 110, junction 112, isolation diode 114, junction 116 and lead 118 and is connected to a turn indicator lamp 109 via lead 108. The other terminals of the turn signal and brake lamps 64 and 66 and the turn signal lamps 92 and 106 are connected to a grounded line 122 through leads 124, 126, 128 and 130, respectively.

The terminal of the first flasher 26 opposite lead 30 is connected to a stationary contact 134 of an emergency flasher switch 136 by means of a lead 131. The opposite stationary contact 138 is connected to the stationary contact 58 of the turn signal switch 52 via lead 140. The terminal of the second flasher switch 32 opposite lead 36 is connected to a third stationary contact 142 of the emergency flasher switch 136 through a lead 144. Stationary contact 146 opposite stationary contact 142 is connected to a junction 148, positioned in lead 50, via lead 150.

Additionally, the stationary contact 56 of the turn signal switch 52 is connected to a fourth stationary contact 152 of the emergency flasher switch 136 via lead 154 and the opposite stationary contact 156 which forms the sixth stationary contact of emergency flasher switch 136 is connected to stationary contact 60 of the turn signal switch 52 via lead 158. It should be noted that the emergency flasher switch 136 also includes a central conductive movable member 135 having conductive cross bars 137, 139 and 141, with the conductive cross bar 137 engaging stationary contacts 134 and 138 and the conductive cross bars 139 and 141 being positioned to bridge stationary contacts 142, 146, 152 and 158, respectively, when the emergency flasher switch 136 is actuated.

Referring now to FIG. 2, there is shown a warning means 160, preferably in the form of a warning lamp, which is adapted to be energized by a circuit means, generally designated by the numeral 162, whenever any one or more of the turn signal lamps or brake lamps 64, 66, 92 and 106 are in their open circuited condition and when these lamps are not energized through the circuit disclosed in FIG. 1 and through the connections previously described in relation to FIG. 2. Moreover, the warning means 160 is also energized, for checkout purpose, during starting operations of an automotive vehicle through a circuit to be subsequently described.

A conventional ignition switch 166, shown in block diagram form in FIG. 2, has one terminal 168 connected to the positive terminal 14 of the source of electrical energy or storage battery 10 through a lead 170. The ignition switch 166 is also provided with an "On" terminal 172 and an "Accessory" terminal 174 which are connected to a lead 176 through leads 178 and 180, respectively. The lead 176 extends into the circuit means 162 and thereby provides a source of electrical energy to the circuit means whenever the ignition switch is in the "Accessory" or "On" position.

The circuit means 162 includes a plurality of voltage dividers, one for each turn signal and brake lamp and, as illustrated, four voltage dividers 182, 184, 186 and 188 are provided with the voltage divider 182 being used in conjunction with the right front turn signal lamp 92, the voltage divider 184 being used in connection with the left front turn signal lamp 106, the voltage divider 186 being used in conjunction with the right rear turn signal and brake lamp 64 and the voltage divider 188 being used in conjunction with the left rear turn signal and brake lamp 66. Each of the voltage dividers comprises a first resistor 190 connected to the lead 176, a second resistor 192 connected in series with the first resistor 190 and a diode 194 connected in series with the resistors 190 and 192. It can be appreciated that the anodes of diodes 194 are connected to the resistors 192 and that the cathodes thereof are connected to a line 196. Each of the voltage dividers 182, 184, 186 and 188 are provided with a junction 198 positioned intermediate the resistor 190 and the resistor 192. The junction 198 of voltage divider 182 is connected to one terminal of right front turn signal lamp 92 through lead 200, junction 102 and lead 104, the junction 198 of voltage divider 184 is connected to the left front turn signal lamp 106 through lead 202, junction 116 and lead 118, the junction 198 of voltage divider 186 is connected to the right rear turn signal and brake lamp 64 through lead 204, junction 76 and lead 78 and the junction 198 of voltage divider 188 is connected to the left rear turn signal and brake lamp 66 through lead 206, junction 88 and lead 90.

The lead 196 is connected to base electrode 210 of a transistor 212 which may be of the NPN-type through a diode 214 and a lead 216. The emitter electrode 218 of the transistor 212 is connected to ground through leads 220, 222 and 224 and the collector electrode 226 of transistor 212 is connected to one terminal of the warning means 160, preferably in the form of a warning lamp, through leads 228, 230 and 232. The other terminal of the warning means is connected to lead 176 through a lead 234. The collector electrode 226 of transistor 212 is also connected to ground through lead 236, normally open switch 238 and lead 240. The normally open switch 238 is operated by means connected to the ignition switch 166 so that it will close when the ignition switch 166 is positioned in the "Start" position thereby grounding the collector 226 of transistor 212 for purposes which will be described subsequently.

The circuit means 162 also includes a second transistor 242 and a third transistor 244 both of which may be of the NPN-type The base electrode 246 of transistor 242 is connected to lead 204 through a current limiting resistor 248 and leads 250 and 252. The collector electrode 254 of transistor 242 is connected to lead 196 through lead 256, while the emitter electrode 258 is connected to a lead 260 via lead 262. The base electrode 246 and the emitter electrode 258 are connected together through a biasing resistor 264 and leads 265 and 262.

The base electrode 266 of transistor 244 is connected through a current limiting resistor 268 and leads 270 and 272 to lead 206, the collector electrode 274 is connected to lead 196 through lead 176, and the emitter electrode 278 is connected to lead 260 through a lead 280. The base electrode 266 and the emitter electrode 278 of the transistor 244 are connected together by means of a biasing resistor 282 and the other leads previously described including leads 260 and 280.

As can be appreciated by the drawing, the lead 260 is connected to lead 222 and hence to ground through this lead and lead 224. The lead 260 is also connected to lead 262 and to lead 265 that is also connected to ground. The circuit means 262 may be comprised of an integrated circuit and, as a result, may be readily installed in an automotive vehicle as a small and low power consuming unit.

OPERATION OF THE INVENTION

Referring now to FIG. 1 the operation of the brake lamp and turn signal circuits including the emergency flasher circuit will be described. As shown in the drawing all of these circuits are in their open condition and hence no current will flow to any of the lamps 64, 66, 92 and 106. If, however, the brake lamp switch 24 is closed by the action of the vehicle operator depressing the brake of the automotive vehicle, the right rear lamp 64 will be energized from the source of electrical energy 10. This occurs through lead 18, lead 16, contact 22 and movable blade 38 of brake lamp switch 24, lead 42, junction 40, lead 46, movable contact member 51, stationary contact 54, lead 68, lead 70, junction 72, isolation diode 74, junction 76 and lead 78. On the other hand, the left rear lamp 66 is energized through the circuitry up to junction 40 and from the junction 40 through lead 50, stationary contact 48, movable contact 53, stationary contact 62, lead 80, lead 82, junction 84, isolation diode 86, junction 88 and lead 90.

When the vehicle operator wishes to execute a left-hand turn, the movable contact 53 is shifted upwardly, as shown in FIG. 1, so that the movable contact 53 is in engagement with stationary contacts 58, 60 and 62. The stationary contact 58 is energized from the source of electrical energy 10 through the flasher 26 and the emergency flasher switch 136. This circuit comprises lead 18, lead 16, junction 20, lead 28, lead 30, flasher 26, lead 131, stationary contact 134, conductive cross bar 137, stationary contact 138 and lead 140. The left rear lamp 66 is then energized via stationary contact 62, lead 80, lead 82, junction 84, isolation diode 86, junction 88 and lead 90, while the left front turn signal lamp 106 is energized via stationary contact 60, lead 108, lead 110, junction 112, isolation diode 114, junction 116 and lead 118. It can also be appreciated that the turn indicator lamp 109 is energized from the lead 108. As a result, current will flow intermittently to the left front and left rear turn signal lamps 106 and 66 to intermittently energize them thereby indicating a left-hand turn of the motor vehicle.

Similarly, if a right-hand turn is to be made by the vehicle operator, the turn signal switch 52 is actuated so that the movable contact 51 comes into contact with stationary contacts 54, 56 and 58. The contact 58 is energized through the flasher 26 and the emergency flasher switch 136 as previously described. The right rear turn signal lamp 64 will be energized intermittently, therefore, from stationary contact 54, lead 68, lead 70, junction 72, isolation diode 74, junction 76 and lead 78, while the right front turn signal lamp 92 will be energized through stationary contact 56, lead 94, lead 96, junction 98, isolation diode 100, junction 102 and lead 104. Also, the turn signal lamp indicator 95 will be energized from the lead 94.

If all four lamps 64, 66, 92 and 106 are to be energized on an intermittent basis to indicate an emergency condition of the vehicle, the emergency flasher switch 136 is moved upwardly, as shown in FIG. 1, so that the stationary contacts 142 and 146 are bridged by conductive bridge portion 139 of the switch and the stationary contacts 156 and 152 are bridged by conductive bridge portion 141 of the switch. As a result, both the left-hand turn signal lamps 66 and 106 and the right-hand turn signal lamps 64 and 92 are energized through the flasher switch 32. During this action, of course, the turn signal switch 52 is not actuated and the movable contacts 51 and 53 remain in the position shown in FIG. 1. At this time, current of an intermittent nature will flow from the source of electrical energy 10 through lead 18, lead 16, junction 20, lead 28, lead 34, lead 36, flasher switch 32, lead 144, stationary contact 142, conductive bridge portion 139, stationary contact 146, lead 150 to junction 148.

During the above described action, current then divides from junction 148 and flows to junction 40, lead 46, stationary contact 44, movable contact 51, stationary contact 54, lead 68 and lead 70 to junction 72. It will then flow to the right rear turn signal lamp 64 through the circuit previously described. Similarly, current will flow from junction 148 through lead 50, stationary contact 48, movable contact 53, stationary contact 62, lead 80 and lead 82 to junction 84. It will then flow to the left rear turn signal lamp 66 through the circuits previously described. Similarly, current will flow from stationary contact 142 of the emergency flasher switch 136 through conductive bridge portion 139, central conductive movable member 135 and conductive bridge portion 141 to stationary contacts 152 and 156. From stationary contact 152 current will flow through lead 152, stationary contact 56, lead 94 and lead 96 to junction 98, and then through junction 98 to the right front turn signal lamp 92 through the circuit previously described. Current will also flow from the stationary contact 156 through lead 158, stationary contact 60, lead 108 and lead 110 to junction 112. Current will then flow to the left front turn signal lamp 106 through the circuit previously described. The turn signal lamp indicators 95 and 109 will be intermittently energized from the leads 94 and 108, respectively, during this condition. It should be noted that the movement of the emergency flasher switch 136 upwardly, as shown in FIG. 1, moves the conductive bridge portion 137 that is in contact with stationary contacts 134 and 138, as shown in FIG. 1, out of contact with these two contacts so no current will flow through these two contacts.

Referring now to FIG. 2, when the ignition switch is turned to either the "Accessory" or the "On" position, current will flow from the source of electrical energy 10 through lead 170 into terminal 168 of ignition switch 166. It may then flow out of the "Accessory" terminal 174 through lead 180 to energize lead 176. It may also flow from the "On" terminal 172 through lead 178 to energize lead 176. When the ignition switch is moved into the "Start" position, a cam means on the switch will close normally open switch 238 and, as is conventional in ignition switches, the "On" terminal 172 will remain energized. Current will therefore flow from the "On" terminal 172 through lead 178, lead 234, warning means 160 in the form of the lamp, lead 232, lead 230, lead 228, lead 236, the closed switch 238 and lead 240. This provides a prove-out means for the warning means or lamp 160 since it will be energized when the ignition switch is moved to the "Start" position.

Assuming that the ignition switch 166 is either in its "On" or its "Accessory" position, the lead 176 will be energized as previously stated. Current will then flow through each of the resistors 190 in the voltage dividers 182, 184, 186 and 188 and then to the lamps 92, 106, 64 and 66. This current will flow from the junction 198 of the voltage divider 182 to the right front turn signal lamp 92 through lead 200, junction 102 and lead 104, to the left front turn signal lamp 106 from junction 198 of the voltage divider 184 through lead 202, junction 116 and lead 118, to the right turn signal and brake lamp 64 from junction 198 of voltage divider 186 through lead 204, junction 76 and lead 78, and to the left rear turn signal and brake lamp 66 from junction 198 to voltage divider 188 through lead 206, junction 88 and lead 90. The isolation diodes 100, 114, 74 and 86 prevent this current from flowing back through the turn signal emergency flasher and brake lamp circuits previously described in relation to FIG. 1.

If the lamps 92, 106, 64 and 66 are all in their operating condition, the current flow through the above described circuits will flow through these lamps and hence shunt the resistor 192 of voltage dividers 182, 184, 186 and 188. As a result, there will be insufficient current flow through these resistors to bias the transistor 212 that is in a normal, nonconducting state into its conducting state. In order to provide a small current flow through the lamps 92, 106, 64 and 68 so that they do not come into incandescence, the resistors 190 of each of the voltage dividers 182, 184, 186 and 188 may have a value of 4,000 ohms and the resistors 192 of each of these voltage dividers may have a value of approximately 2,000 ohms. Thus, if the lamps are all in their proper operating condition, all of the transistors 212, 244 and 242 will remain in their off condition.

If, however, one or more of the lamps 92, 106, 64 and 66 is burned out or is otherwise open circuited, current will flow from the junction 198 of any one of the voltage dividers 182, 184, 186 and 188 through one or more of the resistors 192. Current flow through any one of the resistors 192 will cause current to flow through any one of the diodes 194 and into lead 196. From there it will flow through diode 214 into base 210 of transistor 212 then through emitter 218 of transistor 212, lead 220, lead 222 and lead 224 to ground. This switches transistor 212 to its conducting state and thereby causes current to flow through the warning means in the form of warning lamp 160 through the circuit previously described to the collector electrode 226 of transistor 212. It then flows out of collector 218 to ground through leads 220, 222 and 224. Thus, when any one of the lamps 92, 106, 64 or 66 is open circuited and the ignition switch 166 is in either its "On" or "Accessory" position, the warning means or lamp 160 will be energized. This energization will take place in the absence of the energization of any one of the lamps through the circuit disclosed in FIG. 1.

It can readily be appreciated that when any of the circuits disclosed in FIG. 1, that is, the turn signal circuit, the brake lamp circuit, or the emergency flasher circuit, are energized, a rather heavy current flow will flow into two or more of the junctions 98, 112, 72 and 84 through isolation diodes 100, 114 74 and 86 and this current could flow down through leads 200, 202, 204 and 206 to the junctions 198 of voltage dividers 182, 184, 186 and 188 and thence down through resistors 192 and diodes 194 to the line 196 where it could switch the transistor 212 into its conducting state and thus energize the warning means 160. In order to prevent this action, a disabling circuit means is included in the circuit means 162 and it comprises transistors 242 and 244 and their associated circuitry. The energization of any one of these circuits will switch one or both of the transistors 242 and 244 into their conducting states and this will essentially connect line 196 to ground and drain off the current that would otherwise flow into the base 210 of transistor 212. This action will now be described. It can be readily appreciated that during any of the actions of the three circuits disclosed in FIG. 1, that is, the brake lamp circuit, the turn signal circuit or the emergency flasher circuit, either or both the right rear lamp 64 or the left rear lamp 66 will be energized either in continuous fashion if the brake lamp switch 24 is closed or in an intermittent fashion through either the flashers 26 and 32 when the turn signal circuit or emergency flasher circuit are energized.

If the right rear lamp 64 is energized, current from the junction 72, shown in FIGS. 1 and 2, will flow through isolation diode 74 through junction 76, lead 204, lead 252, lead 250, current limiting resistor 248 into base 246 of transistor 242. Current may then flow from the base 246 through emitter 258 and leads 262 and 265 to ground. This switches transistor 242 to its conducting state so that any current that may tend to flow into lead 196 from diodes 194 of voltage dividers 182, 184, 186 and 188 is shunted to ground and, therefore, is prevented from flowing into the base electrode 210 of transistor 212 thereby preventing the transistor 212 from being switched to its conducting state. As a result, the transistor 212 remains in its nonconducting state.

Similarly, if the junction 84, shown in FIGS. 1 and 2, is energized, current will flow from this junction through isolation diode 86, junction 88, lead 206, lead 272, lead 270, current limiting resistor 268 into base 266 of transistor 244. This will switch transistor 244 to its conducting state so that if any current is present in line 196 from diodes 194, it will flow to ground through lead 276, collector 274, emitter 278 and lead 280. This shunts the current that might otherwise flow into base 210 of transistor 212 thereby keeping the transistor 212 in a nonconducting state and preventing current flow through the warning means 160.

The diodes 194 in the voltage dividers 182, 184, 186 and 188 serve as isolation diodes and prevent current flow in a reverse direction through any of the voltage dividers 182, 184, 186 and 188 should any one or more of the lamps 92, 106, 64 and 66 be open circuited. Similarly, the diode 214 is a blocking diode that will prevent any reverse current flow by zener action backward through the transistor 212.

It can be readily appreciated that the above described invention provides a very convenient means for checking the operability of the lamps 92, 106, 64 and 66 and gives a proper indication when these lamps are open circuited. The warning is given only when the brake lamp, turn signal or emergency flasher signal circuits are not being normally energized by the circuits shown in FIG. 1. As a result, the warning is given if a lamp should be open circuited at a time when the driver of the vehicle may readily notice it since he is not engaged in vehicle maneuvers that will occupy his full attention. Moreover, the warning means will be energized for long periods of time should an open circuit occur in any of the lamps since the warning means will be energized during normal operations when turns are not being executed or when deceleration operations are not being accomplished. It is at these times that the motor vehicle operator need not focus his entire attention upon the operation of the vehicle.

I claim:

1. A warning system for checking failure of a lamp comprising a lamp, a source of electrical energy, means coupled to said source of electrical energy, and said lamp for intermittently energizing said lamp, a warning means, a solid state switching device having output electrodes and an input electrode, means coupling said output electrodes, said warning means and said source of electrical energy, means coupling said lamp and said input electrode of said solid state switching device to a condition in which said warning means is energized when said lamp is in an open circuited condition, a second solid state switching device having output electrodes and an input electrode, said input electrode being coupled to said means coupled to said source of electrical energy and said lamp for intermittently energizing said lamp, and means coupling said output electrodes of said second solid state switching device and the input electrode of said first mentioned solid state switching device for preventing said first solid state switching device from being switched to a state where it energizes said warning means when said means coupled to said source of electrical energy and said lamp for intermittently energizing said lamp is energized from said source of electrical energy.

2. The combination of claim 1 in which said means coupling said lamp and said input electrode of said solid state switching device includes a voltage divider connected between one terminal of said source of electrical energy and the input electrode of said first mentioned solid state switching device, said lamp being connected to an intermediate point of said voltage divider whereby electrical current is shunted around a portion of said voltage divider through said lamp and whereby current flows through the portion of the voltage divider connected to the input electrode of said solid state switching device when said lamp is open circuited, the resistance of the portion of the voltage divider connected between said source of electrical energy and said intermediate point being sufficient to prevent current flow through said lamp to bring it to a level where it reaches incandescence.

3. A turn signal and brake lamp failure warning system for an automotive vehicle comprising, a source of electrical energy, a plurality of signal lamps, a warning means, a turn signal switching means coupled to said source of electrical energy and to said signal lamps for intermittently energizing selected groups of said signal lamps from said source of electrical energy when said turn signal switching means is actuated, a brake lamp switch means coupled to said source of electrical energy and certain of said signal lamps for energizing said certain signal lamps from said source of electrical energy when said brake lamp switch means is actuated, a plurality of voltage dividers, one for each of said lamps, one terminal of each of said voltage dividers being coupled to said source of electrical energy, a solid state switching device having a control electrode and a pair of output electrodes, the other terminal of each of said voltage dividers being coupled to said control electrode, each of said lamps being connected to an intermediate point on its corresponding voltage divider, the change in current to said control electrode when any one of said lamps is open circuited being sufficient to switch said solid state switching device from one state to another state, and circuit means coupled to said source of electrical energy, said warning means and said output electrodes for energizing said warning means when said solid state switching device is switched from one state to the other state.

4. The combination of claim 3 and further comprising disabling means coupled to said turn signal switching means, to said brake lamp switch means and to said control electrode of said solid state switching device for preventing operation of said solid state switching means and energization of said warning means when said turn signal switching means or said brake lamp switch means is actuated.

5. The combination of claim 4 in which said disabling means comprising a second solid state switching device having a switching electrode connected to said turn signal switching means and said brake lamp switch means, and a pair of output electrodes connected in shunt with the control electrode of said first solid state switching device.

6. A warning system for checking failure of a lamp comprising a lamp, a source of electrical energy, means coupled to said source of electrical energy and said lamp for intermittently energizing said lamp, a warning means, a solid state switching device having output electrodes and an input electrode, means coupling said output electrodes, said warning means and said source of electrical energy for controlling the energization of said warning means, means coupling said lamp and said input electrode of said solid state switching device for switching said solid state switching device to a condition in which said warning means is energized when said lamp is in an open circuited condition, said last mentioned means including a voltage divider having one terminal connected to one terminal of said source of electrical energy and the other terminal connected to the input electrode of said solid state switching device, said voltage divider having an intermediate junction connected to said lamp, the resistance of said voltage divider between said one terminal of said source of electrical energy and said junction being sufficient to prevent current flow of a magnitude to energize said lamp to a level where it reaches incandescence.